Figure 1:
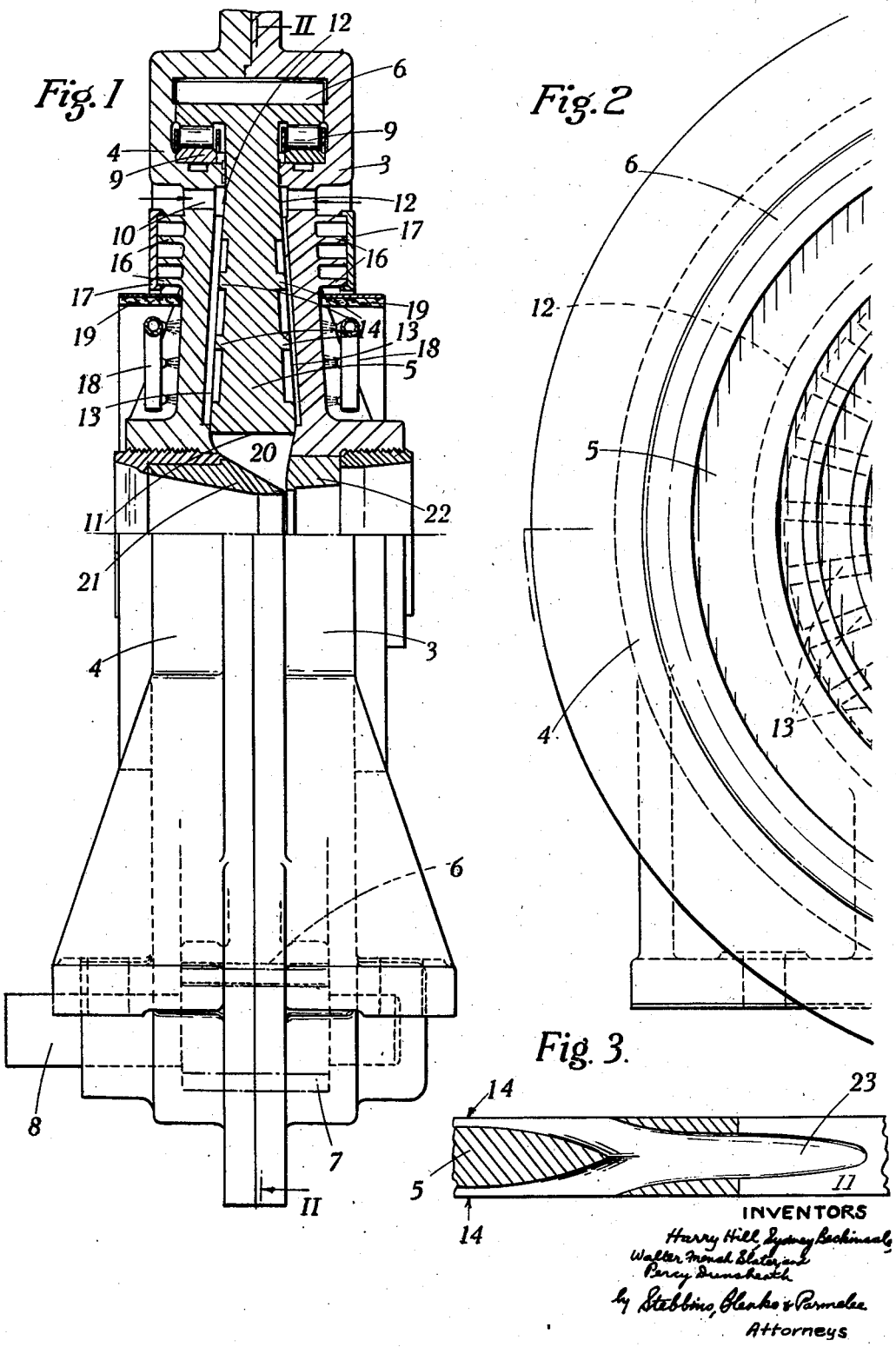

Patented July 6, 1937

2,085,978

UNITED STATES PATENT OFFICE 2,085,978

APPARATUS FOR EXTRUSION OF MATERIALS IN THE PLASTIC STATE

Harry Hill, Sydney Beckinsale, Abbey Wood, London, Walter French Slater, Lewisham, London, and Percy Dunsheath, Sidcup, Kent, England, assignors to Henley Extrusion Machine Company Limited, London, England, a British company Application August 31, 1936, Serial No. 98,696
In Great Britain September 21, 1935

11 Claims. (Cl. 207—2)

This invention deals with the continuous extrusion of material by a method dependent upon the relative rotation of two co-axial members, into the space between the adjacent faces of which the material is fed and is there moved forward in the plastic state by a screwing action.

Machines of this kind hitherto constructed have had their co-operating coaxial parts formed as cylindrical members, one lying within the other. In accordance with the present invention, disc type members are employed with the co-operating surfaces placed parallel with each other. These working surfaces may be flat faces at right angles to the axis or they may be of conical or curved profile.

When using these disc type members, the screw propelling action is provided by spiral grooves or ribs on one member co-operating with an appropriate surface on the other. The form of this second surface will depend partly upon the nature of the material to be extruded. For instance, for rubber, a smooth surface may suffice but, for metal such as lead, it is necessary to break up the surface. For instance, the surface may be provided with radial grooves or a spiral of opposite hand to that of the first member. For the extrusion of metal, it is advantageous to make the spirals of fine pitch and with a comparatively large angle to a radial line. For rubber, the pitch may be coarser and the angle smaller. These spirals may be single or multiple so as to be equivalent to single start or multiple start threads. The discs are mounted with their co-operating faces close together. For producing the relative rotation, it is generally preferable to drive only one of the discs of each pair and to hold the other stationary.

It is preferred to feed the molten metal into the space between the discs at the radially outer part thereof. The metal is then driven inwards radially by the screwing action and is delivered near the axis of the discs to an extrusion chamber, having an outlet at a die or dies, preferably arranged co-axial with the discs.

Since the circumferential length of the spiral groove in one of the discs or the circumferential length of the space between two turns of a spiral projection included between a pair of radial lines decreases as the axis is approached, the depth or width of the groove or the height of the projections may be correspondingly increased in passing from the outer part to the radially inner part of the disc.

It is preferred to use at least two pairs of disc surfaces in a single machine, placing one of each pair of surfaces on a central disc working between two outer discs. This provides a balanced action on the two sides of the central disc and gives an advantageous design of machine. A number of sets of such disc type members may be combined together in a single machine, the sets being arranged side by side along the same axis and preferably having a common feed passage and a common delivery chamber leading to the die or dies.

Figure 2:
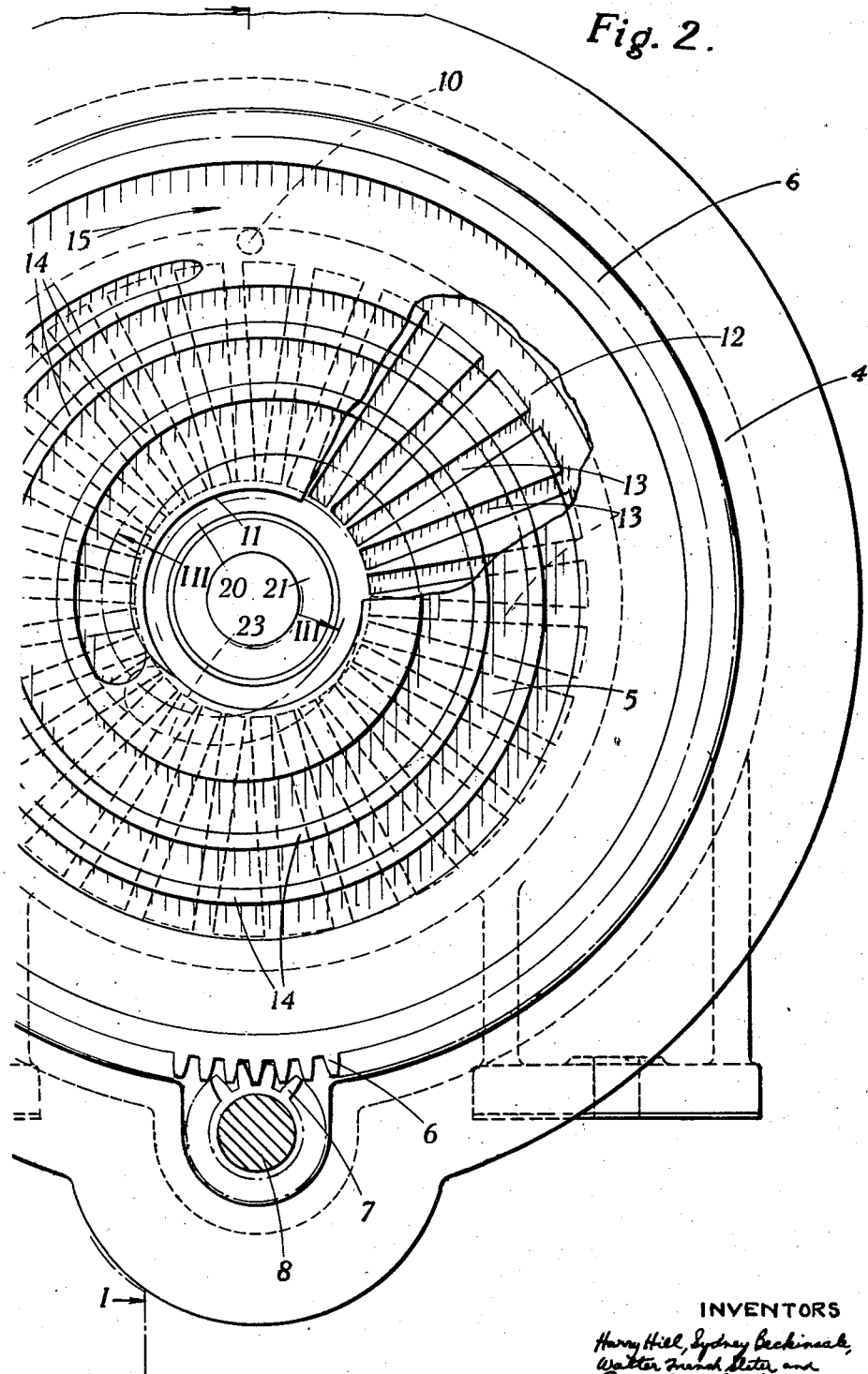

An example of a machine having a single set of disc members is illustrated in Figures 1 to 3 of the accompanying drawings. Figure 1 shows a side view, the upper part being in section, and Figure 2 shows an end view with one half of the casing removed. Figure 3 shows a section of a detail taken on the lines A—B of Figure 2.

Figure 4:
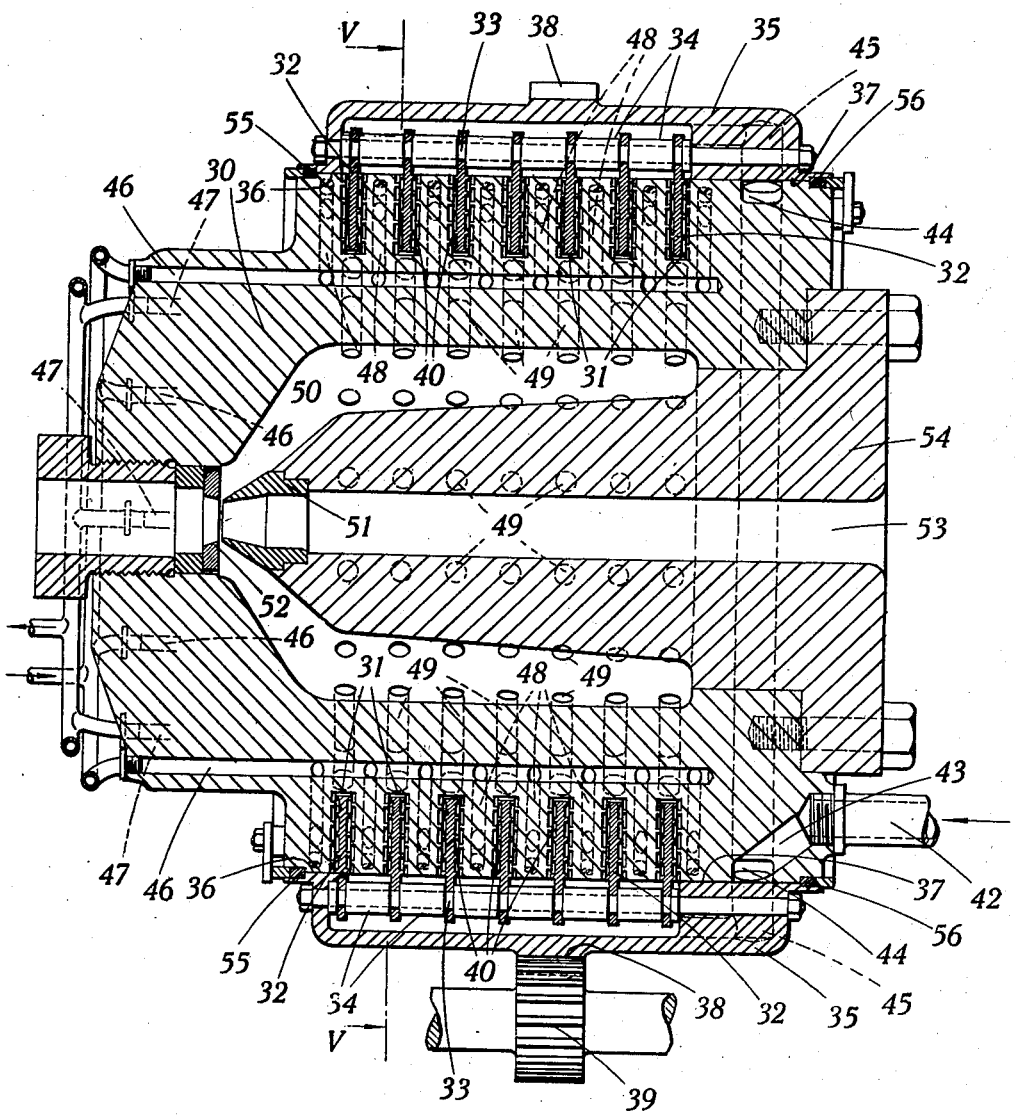
Figure 5:
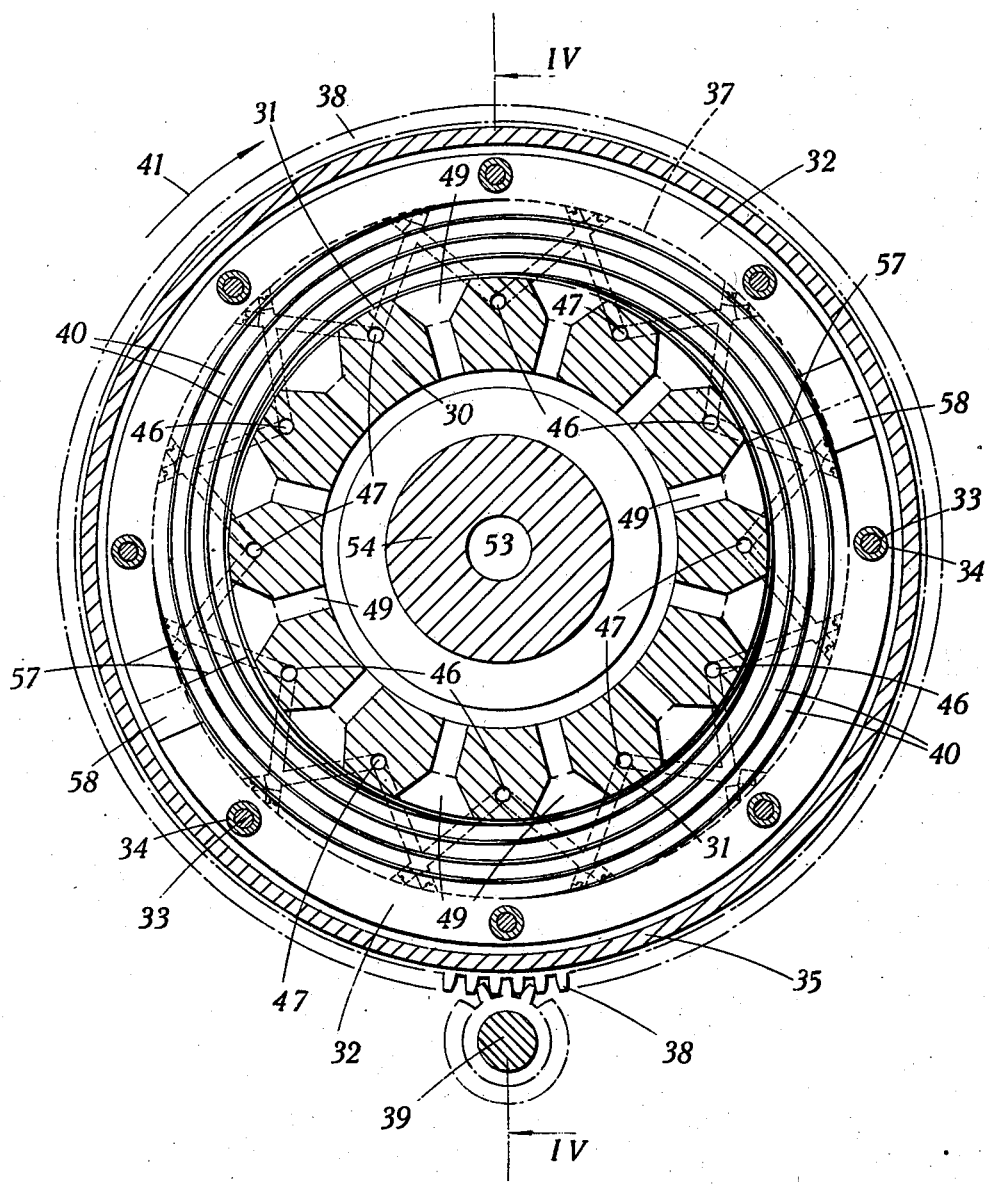

Another example is shown in Figures 4 and 5. In this the machine comprises seven sets of discs arranged with a feed common to all of them and with a common extrusion chamber. Figure 4 is a longitudinal section and Figure 5 is a transverse section on the lines V—V of Figure 4.

Each of these examples is intended for extrusion of metal, such as lead or lead alloys. When the machine is intended for other materials, alterations, which do not affect the invention, will be made. For instance, for rubber there will be a hopper feed instead of the pipe feed suitable for molten lead, and the temperature control arrangements may be varied.

In the examples of the invention shown in Figures 1-3 the two side discs are formed as parts of the two halves 3 and 4 of the casing of the machine. The central disc 5 has a ring of teeth 6 at its outer periphery by means of which it is driven from the pinion 7 on the shaft 8 which is housed in an enlargement of the casing at the bottom of the machine. The disc 5 is supported by roller bearings 9 in the radially outer part of the casing members 3 and 4. The propelling part of the arrangement is located between the inlet passages 10 for molten metal and the inner edge 11 of the central disc 5.

A number of inlet passages 10 may be located at different circumferential positions around the casings 3 and 4. They deliver into two circular chambers 12 formed by recesses in the inner faces of the casing members 3 and 4.

A fragment of one of these grooves 12 is shown by dotted lines in Figure 2; located adjacent to it are shown in a similar way two of the ribs 13, which run radially across the inner surfaces of discs 3 and 4 from the recesses 12 to the neighbourhood of the inner edge 11 of the disc 5.

These ribs 13 co-operate with spiral ribs 14, one of which is provided on each face of the disc 5. As will be seen from Figure 2 the radial width of the channel between the turns of each of these ribs 14 increases in passing through the outer part to the radially inner part of the disc 5.

There is a small clearance between the tops of the ribs 13 and the spiral ribs 14.

The metal which is fed in in the molten state through the inlets 10 passes into the spaces between the ribs 13 and between the ribs 14 and is cooled so that it solidifies therein. This cooling is brought about by the dissipation of heat from the surfaces of the cooling ribs 16 on the outer surfaces of the discs 3 and 4. This dissipation may be assisted by blowing air over these ribs, or by circulating water in contact with them. The latter is indicated in the drawings by the enclosure of the spaces between the ribs by the plates 17. To prevent cooling of the metal beyond the desired temperature at which it has sufficient plasticity for the working of the machine, heating members such as gas jets 18 may be applied to the radially inner parts of the discs 3 and 4. The heating and cooling arrangement may be separated by an asbestos-lined baffle ring 19.

The metal having been fed into the spaces between the ribs and the discs and having reached the plastic state therein, is fed forward in a radially inward direction by the rotation of the disc 5. This movement causes it to be delivered to the annular space 20 lying beyond the inner edge of the disc 5. This space forms an extrusion chamber from which the metal can be forced out through an aperture of the appropriate shape to produce the required article. In the case illustrated a tube, which may be the sheath of an electric cable, is to be formed. For this purpose the metal is extruded between the inner die 21 and the outer die 22.

The two spiral grooves lying between the turns of the ribs 14 on the two sides of the disc 5 can terminate on each side of the disc in the opening between the points 1 and 2, Figure 2, leading into the extrusion chamber 20. In the example illustrated, with the assistance of Figure 3, these two grooves are shown as combining together before they reach the chamber 20, which they enter by the passage 23.

In the form of the machine illustrated in Figures 4–5, the multiple disc arrangement is employed. The main body 30 of the machine is provided with a number of deep annular grooves 31, the two side faces of which co-operate with the adjacent faces of the disc 32, which lie in the grooves with a small clearance. These discs 32 are mounted on rods 33, being located thereon by spacing sleeves 34. These rods 33 are mounted at their ends in an outer casing 35. This casing has a bearing on the main body 30 of the machine at 36 and 37. It is provided on its periphery with a ring of teeth 38, by which it engages with a pinion 39 on a driving shaft. By this means the casing 35 can be kept in continuous rotation, carrying with it the discs 32.

Instead of utilizing rods for the connection between the casing 35 and the discs 32, it may in some cases be preferable to provide the casing with inwardly projecting longitudinal ribs and form the discs with recesses to engage these ribs, so that the discs are supported directly on and driven by the casing without the intervention of any other part.

The two faces of the discs 32 are provided with spiral grooves as shown at 40 on Figure 5. The adjacent faces of the grooves 31 in the body 30 are also provided with grooves similar to those in the discs 40, but of opposite hand. By rotating the disc 32 in the direction indicated by the arrow 41 in Figure 5, a propulsive action is exerted on plastic lead which occupies the space between the side walls of the grooves 31 and the discs 32. This propulsive action forces the metal towards the radially inner parts of the grooves 31.

At the rear end of the body 30 a pipe 42 supplies molten metal. This passes through a passage 43 in the body 30 to a groove 44 on the outer periphery of that body at the part covered by the casing 35. The groove 44 extends completely round the body 30 and may be fed by a number of pipes 42 and passages 43, disposed at intervals round the body 30. In the casing 35 are provided a number of passages 45 which lead from the groove 44 to the interior of the casing 35 and thence to the spaces between the discs 32 and the walls of the grooves 31. The space within the casing 35 is by this means kept full of molten metal, which can pass from the casing to the spaces between the discs and the walls of the grooves 31.

When the metal has entered these spaces where the spiral grooves engage it, it is necessary for the metal to be cooled so as to change from the molten to the plastic state. This is effected by the use of a system of cooling passages within the body 30 through which cooling medium, such as oil or steam, can be caused to flow. This cooling system comprises a number of longitudinal passages 46 and 47. The passages 46 carry the cool liquid inward and the passages 47 bring back the heated liquid. These passages 46 and 47 are interconnected by a number of cross passages 48, which extend outwards from the region of the passages 46 and 47, into the parts of the main body 30, which lie between the grooves 31 and at each end of this set of grooves. One of these passages 48 is shown in Figure 5. It will be understood that they are distributed uniformly all round the body 30, but for the sake of clearance only one passage has been shown in the drawings.

By the circulation of the cooling medium the molten metal which has come into contact with the spiral grooves is changed to the plastic state and in that condition is driven forward by the rotation of the discs 32, so that it moves towards the radially inner parts of the grooves 31. When it reaches the inner ends of these grooves it is driven through passages 49 into the extrusion chamber 50. As will be seen from Figure 5 the passages 49 are distributed all round the body 30 so that when the machine is in action a large number of streams of plastic metal are delivered into the extrusion chamber 50 and mingle with each other therein so as to form a homogeneous body of plastic material which by the continuous driving pressure exerted by the discs 32 through the plastic metal is driven forward towards the front or outlet end of the extrusion chamber 50 where are placed the inner and outer dies 51 and 52. In the example illustrated these are arranged to deliver a tube of metal, which may be a sheath of an electric cable, the core of which is fed through the central hole 53 in the member 54, which is mounted in the body 30 and supports the inner die 51 and provides the inner wall for the extrusion chamber 50. To secure the joint between the casing 35 and the body 30 against leakage of molten metal, packing is provided at each end as shown at 55 and 56. It will be noted that this joint is only under the pressure of the head of molten metal. This is comparatively small. The machine has no running joint which is subjected to the extrusion pressure.

In order that the discs 32 may be inserted in the grooves in the body 30 each disc is split as indicated at 57, the two halves being secured together by jointing plates 58. The spiral grooves in the side walls of the main grooves 31 may be formed in the body 30, but are preferably provided on liners (not shown) which are inserted in the grooves and secured to the walls thereof.

It may be necessary to provide temperature control in addition to that described in the drawings. For instance, it may be necessary to heat the outside of the casing 35 to maintain the metal in the molten state in the outer part of that casing. It may also be necessary to apply additional controlling means for regulating the temperature of the metal in the extrusion chamber and that which is actually passing through the dies.

It will be understood that the drawings are to a certain extent diagrammatical. They illustrate the invention rather than show the complete structural details of the machine.

The disc type construction embodied in the machine, in accordance with the invention, has the advantage of providing a particularly convenient form of drive for the moving part of the machine, including facility for giving to the driving member or members the necessary strength. The type of machine also has the advantage of the avoidance of the use of a running joint, working under high pressure. It also facilitates the production of a compact machine structure, which is at the same time accessible to temperature control. It is suitable for embodiment in designs for either small or large output.

What we claim as our invention is:—

1. A rotary impelling device for the extrusion of plastic material comprising two co-axial disc-type members, with parallel adjacent surfaces, at least one of which has a spiral rib, and means for producing rotary motion of one of said members relative to the other, thereby causing material between the discs to be forced in a generally radial direction by the co-operation of the spiral rib on one member and the adjacent surface of the other member.

2. A rotary impelling device for the extrusion of plastic material comprising two co-axial disc-type members with parallel adjacent surfaces, at least one of which has a spiral rib, means for producing rotary motion of one of said members relative to the other, thereby causing material between the discs to be forced inward, and an extrusion chamber adjacent to the axis of said members, receiving the material from the said members.

3. A rotary impelling device for the extrusion of plastic material, comprising three co-axial disc-type members with parallel adjacent surfaces, at least one of each pair of adjacent surfaces having a spiral rib on it, means for producing rotary motion of the central member relative to the two outer members, thereby causing the material between the two pairs of parallel surfaces to be forced in a generally radial direction by the co-operation of the spiral ribs and the adjacent surfaces, the two outer members being symmetrically placed relative to the inner member and the adjacent working surfaces being of the same dimensions whereby the axial forces exerted by the material on the central member are approximately balanced.

4. A rotary impelling device for the extrusion of plastic material, comprising three co-axial disc-type members with parallel adjacent surfaces, at least one of each pair of adjacent surfaces having a spiral rib on it, means for producing rotary motion of the central member relative to the two outer members, thereby causing the material between the two pairs of parallel surfaces to be forced inward by the co-operation of the spiral ribs and the adjacent surfaces, the two outer members being symmetrically placed relative to the inner member and the adjacent working surfaces being of the same dimensions whereby the axial forces on the central member are approximately balanced, and an extrusion chamber adjacent to the axis and surrounded by the said members and receiving the material therefrom.

5. A rotary impelling device for the extrusion of material comprising a central rotary disc member and two fixed disc members one on each side thereof and having their adjacent surfaces parallel, a spiral rib on one surface of each of the pairs of adjacent surfaces, bearings carried by the side members and supporting the central member and lying radially outside the region occupied by the said spiral ribs and driving means acting on the central disc member and at its periphery.

6. A rotary impelling device for the extrusion of material comprising a central rotary disc member and two fixed disc members one on each side thereof and having their adjacent surfaces parallel, a spiral rib on one surface of each of the pairs of adjacent surfaces, bearings carried by the side members and supporting the central member and lying radially outside the region occupied by the said spiral ribs and an extrusion chamber lying radially inside the central disc member and receiving material from each side thereof.

7. A rotary impelling device for the extrusion of material comprising a circular body member having an annular recess in its outer surface, an annular disc in said recess, one of each of the adjacent surfaces of the disc and the recess having a spiral rib on it, driving means acting on the outer part of said disc to rotate it relative to said body member, an extrusion chamber within said body member connected with the radially inner part of said recess so as to receive material therefrom.

8. A rotary impelling device for the extrusion of material, comprising a cylindrical body member having a plurality of annular recesses in its outer surface, an annular disc in each of said recesses, one of each pair of adjacent surfaces of each disc and recess having a spiral rib on it, a driving member engaging said discs and running on said body and means for rotating said driving member about said body.

9. A rotary impelling device for the extrusion of material, comprising a cylindrical body member having a plurality of annular recesses in its outer surface, an annular disc in each of said recesses, one of each pair of adjacent surfaces of each disc and recess having a spiral rib on it, driving means acting on said discs to rotate them relative to said body member and temperature controlling means located in said body member between said recesses.

10. A rotary impelling device for the extrusion of material, comprising a stationary circular body member having an annular recess in its outer surface, an annular disc in said recess, one of each of the adjacent surfaces of the disc and the recess having a spiral rib on it, driving means acting on the outer part of said disc to rotate it relative to said body member, an annular extrusion chamber within said body member and connected with said recess to receive material therefrom, the outer wall of said extrusion chamber being formed by said body member, a tubular member located within said body member and forming the inner wall of said extrusion chamber, an outer die carried by said body member and an inner die adjacent to said outer die and carried by said tubular member.

11. A rotary impelling device for the extrusion of metal comprising three co-axial disc-type members with parallel adjacent surfaces, at least one pair of adjacent surfaces having a spiral rib on it, the region occupied by said rib being a propelling zone in which the metal is driven forward, annular feeding means supplying molten metal to each side of the central disc, forming a feeding zone lying radially outside the propelling zone, an extrusion chamber lying radially inside the propelling zone, and receiving metal therefrom, temperature control means acting on the propelling zone and means for rotating the central disc.

HARRY HILL.
SYDNEY BECKINSALE.
WALTER FRENCH SLATER.
PERCY DUNSHEATH.